United States Patent [19]

Chatterton

[11] 4,070,302

[45] Jan. 24, 1978

[54] FOAM PRODUCING EQUIPMENT

[76] Inventor: James L. Chatterton, 2916 Philadelphia Drive, Dayton, Ohio 45405

[21] Appl. No.: 672,738

[22] Filed: Apr. 1, 1976

[51] Int. Cl.² .............................................. B01J 13/00
[52] U.S. Cl. .................................. 252/359 E; 169/15; 239/343; 261/DIG. 26; 222/195
[58] Field of Search .............. 252/359 E; 159/DIG. 4; 169/14, 15; 239/343; 261/DIG. 26; 23/252 B; 222/190, 195; 260/2.5 BC, 2.5 BD

[56] References Cited

U.S. PATENT DOCUMENTS

| | | | |
|---|---|---|---|
| 1,995,215 | 3/1935 | Mehlsen | 252/359.5 |
| 2,577,025 | 12/1951 | Lundberg | 239/343 |
| 3,388,868 | 6/1968 | Watson | 261/DIG. 26 |
| 3,595,298 | 7/1971 | Enders | 159/6 R |
| 3,964,146 | 6/1976 | Vestre | 165/162 |
| 3,979,326 | 9/1976 | Chatterton | 252/359 E |

*Primary Examiner*—Hiram H. Bernstein

[57] ABSTRACT

Foam producing equipment in which a container interior is sub-divided by a concentric array of cylindrical shells into radially spaced concentric chambers. A relatively small amount of a foamable liquid solution is held in the lower part of the container, and, above the liquid level, the shells are selectively perforated. A compressed gas is admitted to an outermost concentric chamber and agitates the liquid solution therein to form a foam which rises and then in a generally radial motion moves progressively through the perforate wall portions of the concentric shells to a foam outlet associated with a central, innermost concentric chamber. A staged extraction of liquid, with foam compaction, occurs as the foam is forced through successive perforate shell portions, with separated liquid utilizing imperforate wall portions of the shells to drain back into the supply of the liquid solution. A highly efficient use of liquid solution and gas produces large quantities of a dense, low moisture foam variously useful in fire fighting, cleaning, and in the application of agriculture herbicides, insecticides, fertilizers and the like.

10 Claims, 3 Drawing Figures

FOAM PRODUCING EQUIPMENT

BACKGROUND OF THE INVENTION

This invention relates to improvements in foam producing equipment. Embodiments have a wide field of application, with a particular utility in fire fighting on account of a unique capability in producing large quantities of a dense low moisture foam with an economical use of liquid detergent type solutions and compressed gas.

Foam producing apparatus as known heretofore, even as shown in applicant's own prior application for U.S. Letters Pat. Ser. No. 459,882, filed Apr. 11, 1974 for FOAM PRODUCING APPARATUS, now Pat. No. 3,979,326, dated Sept. 7, 1976 provides for a generally free rising foam to move through vertical stages the arrangement of which necessitates the use of a relatively large vertically extended container in order to properly develop the foam. In use of such apparatus provision must be made to prevent liquid separated in the upper portions of the container from interfering with and wetting the rising foam. Efforts in this direction have met with limited success although definite improvement was effected in the art by reason of applicant's own previous above identified invention.

A further problem that has been found in use of prior art apparatus for foaming purposes is that while such apparatus does in some instances effectively produce foam having a relatively low moisture content, the efficiency of such production, that is the volume of foam produced in relation to the quantity of liquid solution and compressed gas employed, has not been notably high. Nor does the normally produced foam have the degree of dryness to satisfy certain critical applications. It has been basically evident in use of prior art apparatus, moreover, that a large volume production of very dry foam with a relatively low consumption of liquid solution, a desirable and necessary objective where such apparatus is to be used to fight fires, has heretofore been difficult to achieve.

SUMMARY OF THE INVENTION

The present invention provides apparatus for producing an unusually dry foam, and in a volume suitable for fire fighting, in a manner enabling a highly efficient use of liquid solution. For example, and while the ratio may vary, such apparatus is capable of producing at least a gallon of dense dry foam while consuming only two ounces of a detergent type liquid solution.

The invention apparatus is characterized by a container of relatively low height in which a staged extraction of liquid from moving foam is effected without a use of vertically spaced staging screens or the like, and without need for specially provided drain surfaces. According to the invention, the container interior is sub-divided by a plurality of vertically orienting concentric tubular shells into a series of concentric chambers. A predetermined quantity of a foamable liquid solution is maintained in the lower part of the container and a compressed gas, for example compressed air, is admitted below the liquid level at a location within the outermost one of the concentric chambers. Active foaming occurs in the outermost chamber, in response to agitation of the foamable solution induced by the compressed gas. In the concentric shells, at locations above the liquid level, are perforations which allow created foam to move progressively, and in a radial sense, from the outermost chamber and through intermediate chambers to the innermost core chamber where a container aperture defines a foam outlet. In being forced through the perforations, in the respective interior shells, forces of compression are brought into play and bubbles larger than the perforations are squeezed therethrough and caused thereby to yield up portions of their contained liquid. In successively encountered concentric cylinders, the perforations are of progressively smaller size so that ever smaller bubbles are created as they are squeezed therethrough and stripped of further portions of their liquid content. The product which finally emerges from the container foam outlet is a very dry, dense, high quality foam.

In the operation of the apparatus, the extracted liquid drains down the concentric shells to the liquid level, efficient drain surfaces being thus inherently provided. The arrangement, it will be recognized, is one in which a compact container device utilizes a generally new concept in producing high quality foam in good volume, in dryer condition than normally developed in prior art apparatus and at a relatively low cost in expended liquid solution.

An object of the invention is to provide improved means for dispensing a foam material having general utility.

Another object of the invention is to provide improved foam producing equipment which is economical to fabricate and employ, more efficient and satisfactory in use, adaptable to a wide variety of applications and unlikely to malfunction.

A further object of the invention is to provide generally new foam producing equipment featuring a compact container in which forming foam moves in a generally radial path through concentric chambers prior to discharge.

Still another object of the invention is to accomplish a staged extraction of liquid from and reduction in size of the bubbles of a forming foam by radially spaced means inherently providing drain surfaces for extracted liquid in a manner to obviate it interfering with or perceptibly diminishing the quality of the moving foam.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalent.

Referring to the accompanying drawing wherein is shown one but obviously not necessarily the only form of embodiment of the invention.

Like parts are indicated by similar characters of reference through the several views.

The foam producing concept of the invention is illustrated as embodied in a container 10 the peripheral, outer most wall of which is defined by a vertically oriented tubular shell 11. The shell 11 is bridged at its bottom by a plate-like closure element 12 to which are fixed dependent feet 14. The feet 14 may be adapted, if desired, to incorporate casters or wheels to lend mobility to the container 10, as and when required.

Figure 1:
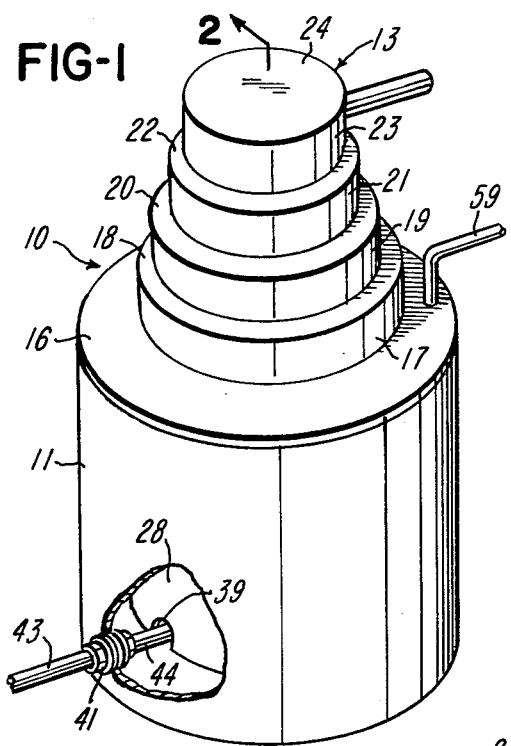
FIG. 1 is a perspective view of a foam producing device in accordance with the present invention, a portion of the illustrated container being broken away to show interior details.
Figure 3:
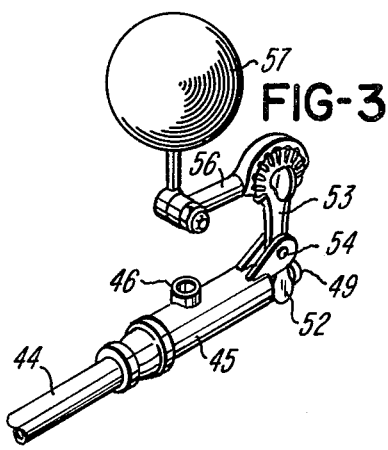
FIG. 3 is a fragmentary view illustrating the liquid flow control valve and its operating controls as embodied in the container.
Figure 2:
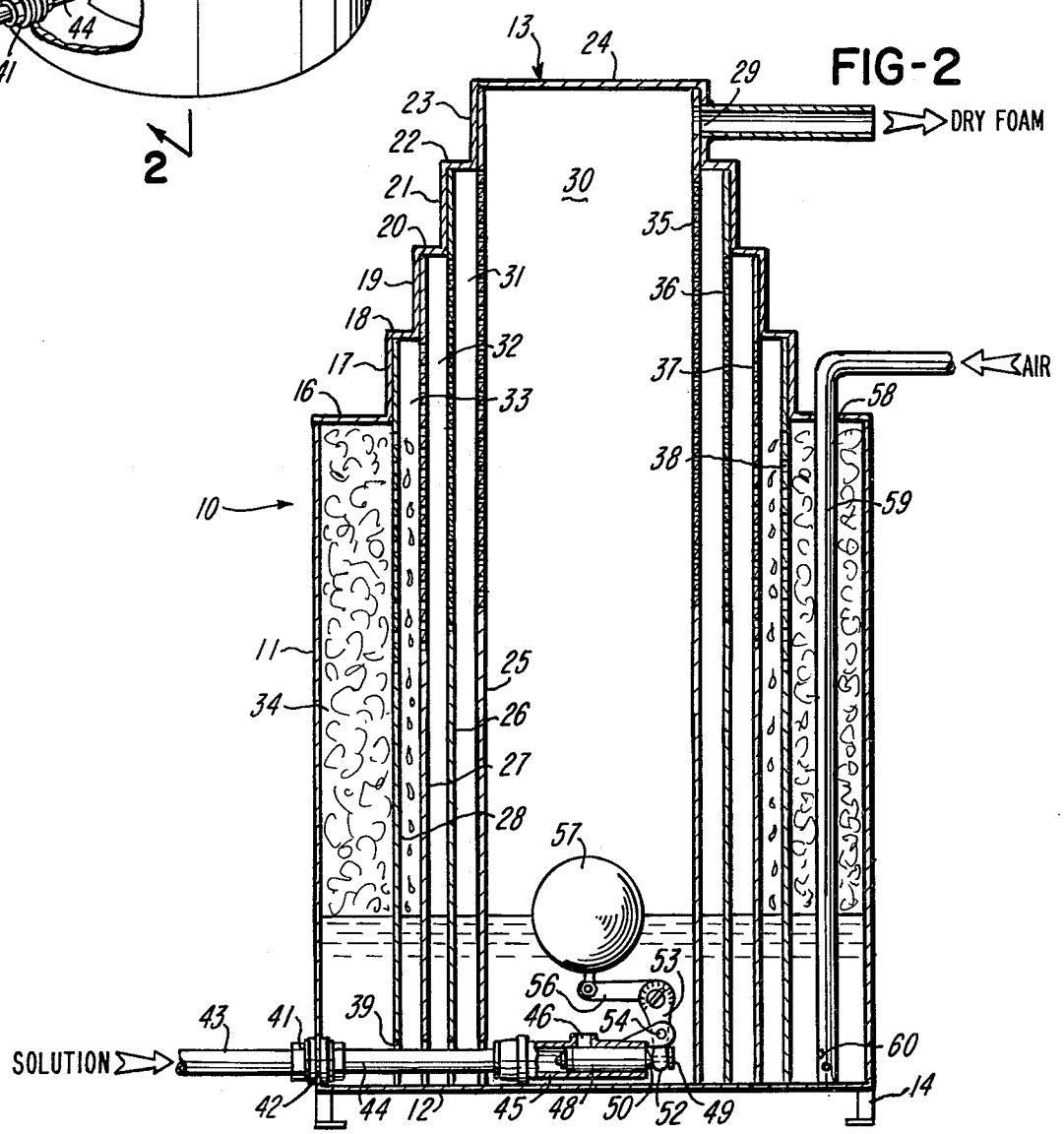
FIG. 2 shows a vertical section of the container of FIG. 1 which reveals its interior structure.

The shell is sealed at its top by a generally cupshaped closure element 13. As applied, the element 13 is inverted and a rim at the lip thereof is welded to the upper edge of the shell 11. As may be seen from FIG. 1 of the drawings, the peripheral wall of the element 13 is so vertically stepped that the respective sections thereof form its interior space into disc-like tiers each of which has essentially the same limited depth. More particularly in this respect, the base of this tiered structure is provided by a plate-like annular rim 16 at the mouth of the cup the outer peripheral edge of which is welded to the upper edge of the shell 11. The rim 16 extends in a plane at right angles to the central vertical axis of the shell 11 and integrally joins, at its inner periphery, to a ring-shaped upwardly and perpendicularly projected wall section 17 of the closure element 13. The wall section 17 has its uppermost edge integral with the outer peripheral edge of a further plate-like annular section 18 of the peripheral wall of the element 13 which lies in a plane parallel to the rim 16. Note that the width of the section 18 is less than that of the rim 16. The inner peripheral edge of the section 18 is similarly joined, in turn, to the lower end of an upwardly directed section 19 of the peripheral wall of closure element 13 the vertical extent of which is equal to that of the section 17 and concentric thereto. The upper edge of the section 19 is integrally joined to the outer peripheral edge of an annular wall section 20 equal in width to the section 18 and parallel to both the sections 16 and 18. Section 20 is joined at its inner peripheral edge to a further vertically projected section 21 of the peripheral wall of the element 13. The section 21 is equal in depth to the section 19, in concentric spaced relation thereto and joined at its upper end to the outer peripheral edge of an annular section 22 equal in width and parallel to the sections 18 and 20 of the element 13. Connected integral with the inner peripheral edge of the section 22 is a further perpendicularly projected ring-like section 23 which is bridged at its top by the disc shaped base portion 24 of the element 13 which forms the peak of the container 10. As thus provided, the closure element 13 forms interiorly thereof a series of vertically spaced shoulders arranged to face inwardly of the container 10, in parallel relation to each other and to the bottom closure element 12. These shoulders, which are respectively defined by the annular sections 16, 18, 20 and 22 and the peak portion 24, are equidistantly and vertically spaced by the respective rimming ring-like wall sections 17, 19, 21 and 23. The purpose of this construction shall soon be obvious.

The interior of the container 10 is sub-divided into a series of concentric chambers by the placement therein of a plurality of vertically oriented, concentric, radially spaced, thin walled tubes or shells 25–28. The tube 25 is centrally and vertically positioned to have its upper end seat in abutment with the peak portion 24 of the element 13 and its lower end seat on the bottom closure element 12. The external diameter of tube 25 is such that its upper end is press fit to have the peripheral portion thereof mount in sealing engagement with the inner surface of the ring-like wall section 23. The end portion of the shell 25 which lies within the wall section 23 is provided with a notch positioned in alignment with an aperture 29 in the wall section 23. As so fixed, the shell 25 defines the inner or core chamber within the container 10 while the aperture 29 provides its discharge aperture. Shell 26 is positioned immediately about and in concentric spaced relation to the shell 25 by being fixed in the container 10 in similar fashion. In this instance the peripheral outer surface portion of the upper end of the shell 26 is rimmed by and in sealing contacting relation to the section 21 of the closure element 13. The shell 26 is so fixed as to seat its lower end to the closure element 12 and to define with the shell 25 an annular chamber 31. Shells 27 and 28 which are successively positioned outwardly of and in spaced concentric relation to the shell 26 have their upper ends respectively in peripheral sealing engagement with the ring-like sections 19 and 17 while their bottom ends seat to the base closure element 12. As so positioned in the container 10 the shell 27 defines, with the shell 26, an annular chamber 32 and the shell 28 defines with the shell 27 an annular chamber 33. The shell 28 simultaneously defines an outermost chamber 34 with the outer wall of the container formed by the shell 11. For reasons which will hereinafter more clearly appear, the construction provides that the spacing between the shell 28 and the shell 11 is greater than that between the shell 28 and the shell 27. Of course, since the radial widths of the shoulders defined by the wall sections 18, 20 and 22 are equal, the radial widths of the chambers 31, 32 and 33 are equal.

Thus, the interior of the container 10 is divided to provide a core chamber surrounded by concentric chambers 31, 32, 33 and 34. It should be noted that by reason of the configuration of the upper closure element 13 the vertical extent of the core chamber 30 is greater than that of any of the surrounding chambers which are successively reduced as to their vertical extent from the inner to the outer thereof. In an area limited to the upper half part thereof the tube 25 is provided with a multitude of uniformly distributed apertures 35 through which the chamber 31 is placed in limited communication with the core chamber 30. Similarly, in an area limited to the upper half part thereof, the tube 26 is provided with uniformly distributed apertures 36, tube 27 with uniformly distributed apertures 37 and tube 28 with uniformly distributed apertures 38. The vertical extent of the portion of each of the tubes 25 through 28 in which apertures are placed is essentially the same, in the example illustrated. Accordingly, the lower limit of the apertures 37, with respect to the vertical dimension of the container 10, is higher than that of the apertures 38 and lower than that of the apertures 36 and 35. Similarly, the lower limit of the apertures 36 is higher than that of the apertures 37 and lower than that of apertures 35. As a further and important limitation on the respective apertures 35, 36, 37 and 38, the largest thereof are the uniformly formed apertures 38 and the apertures decrease in size in the respective tubes in a sense inwardly towards the core chamber 30. An exemplary embodiment of the invention which functions with considerable efficiency provides that the apertures 38 have a one-quarter inch diameter, the apertures 37 a three-sixteenth inch diameter, the apertures 36 a one-eighth inch diameter and the apertures 35 a three-thirty second inch diameter.

Each of the tubes 25, 26, 27 and 28 has a cut out or notch 39 in its lower end. These notches are radially aligned to provide a through passage from the outermost chamber 34 to the bottom of the core chamber 30. Mounted in an opening in the outer wall 11 of the container 10, at the lower end thereof and in line with the passage defined by the notches 39 is a tubular fitting 41. Grommet means 42 is provided to insure a seal about the fitting as it is projected interiorly of the container 10. In connection with the outer end of the fitting 41 is the delivery end of a conduit 43 the remote end of which (not shown) is adapted to be connected to a supply of a detergent type foamable liquid solution. Within the container 10 the delivery passage defined by the fitting 41 is extended by a relatively rigid conduit segment 44. The conduit segment 44 is projected through the notches 39 and into the core chamber 30 and a clear though limited space is provided thereabout as it passes through each of the tubes 28, 27, 26 and 25. The innermost end of the conduit segment 44 is coupled to and extended by the tubular housing 45 of a valving structure which positions within and at the bottom of the core chamber 30. Centered intermediate the ends of the tube segment defining the housing 45, and at the top thereof, is a radial port 46. Bearing for reciprocal movement in the projected extremity of the housing 45, to maintain a seal thereof, is a cylindrical piston 48 mounted on one end of a piston rod 49. The outermost end of the rod 49 has a necked portion 50 defining spaced shoulders intermediate of which it is embraced by arms 52 formed at the lower end of a lever 53, and so connected as to by reciprocable through the medium of a pivoting movement of the lever 53. The lever 53 is short, generally vertically oriented and mounted intermediate its ends by a pin 54 which pivotally connects it to an ear-like structure formed integral with the housing 45. The uppermost end of the lever 53, which has a relatively short vertical extent, is adjustably secured in a conventional manner to one end of an arm 56 the other end of which is pivotally connected to an adapter in connection with the under side of a bouyant spherical bulb 57.

At the side of the container 10 diametrically opposite and remote from that portion accommodating the inlet fitting 41 the annular portion 16 of the top closure element 13 is provided with an aperture 58 through which is projected a small bore tubular conduit element 59 the lowermost end of which is accommodated in an opening in the bottom closure element 12. This lowermost end of the conduit 59 is provided with a suitable releasable plug. Suitable sealing means are provided about the conduit 59 at those points where the same passes through apertures in the housing defined by the container 10. As thus positioned, conduit 59 is located in the outer annular chamber 34 and adjacent the lower end thereof is provided with one or more small diameter radial openings or ports 60. The uppermost end of the conduit 59, outwardly of the container 10, is adapted to be suitably extended to couple to a line leading from a source of compressed gas, for example a reservoir of compressed air such as may be provided in a portable tank.

As thus provided and heretofore noted, the invention embodiment provides a container 10 sub-divided, interiorly thereof, into a series of chambers 31, 32, 33 and 34 which are radially spaced and concentric to a central core chamber 10. To this container a supply of foamable solution may be readily coupled by way of the conduit 43 and directed to the bottom of the chamber 30 by way of the inlet 41, its extension 44 and the continuation defined by the valve housing 45. In the first instance the piston 48 will be positioned outwardly of and beyond the port 46, through which the solution will pass to the chamber 30. Until such time as the liquid level in the bottom of the chamber 30 reaches a level suitable for the purpose desired, the bulb 57 will rise until it does so sufficiently to rock the lever 53 about its pivot to cause piston 48 to move inwardly of housing 45 sufficient to block off the port 46 from the incoming solution. As will be obvious, an appropriate adjustment of the connection of the arm 56 to the lever 53 is all that is necessary to set the level at which the closure of the port 46 occurs.

Thus when the level of the detergent solution in the bottom of the container rises sufficiently to carry the bouyant sphere upwardly to cause a shifting of the piston to close the port 46, the initial delivery of the detergent solution will be terminated. The solution may be delivered from a holding tank under the influence of head pressure or in response to the operation of an interposed pump (not shown). It will be seen that in the process of delivery of the solution the notches 39 provide for a distribution of the solution entering the core chamber 30 to the various outlying chambers, as a consequence of which the solution will reach an essentially common level in the respective chambers at the time delivery is initially terminated. It will of course be further obvious that the system provides an automatic replenishing of the solution in the bottom of the chamber 10 as the solution is used in a foaming procedure.

Attention is directed to the fact that the level of the liquid solution provided in the container 10 will be maintained substantially below the level of the lowermost of the apertures 35 through 38 provided in the upper portions of the respective tubes which sub-divide the interior of the container 10.

To utilize the apparatus above described for the purpose intended, such as in fire fighting, a source of compressed air is coupled to the conduit 59 and when released the compressed air is directed through such conduit to enter the foamable solution in an area in the bottom of the chamber 34, by way of the radial ports 60, in a jet-like flow. As the compressed air enters the liquid solution it will create bubbles forming foam which builds up and rises through the liquid solution to spread immediately above its upper level, initially in the limited area of air delivery and then from this point circumferentially about the tube 28 in the chamber 34. As noted previously, the volume of the chamber 34 is substantially greater than that of the chambers 33, 32 and 31. This, accordingly, permits that a large volume of wet, low density foam can be built up in the chamber 34 in response to the continuous agitation of the foamable solution by the air jets issuing by way of the ports 60. The only possible excape for the foam crowded into the chamber 34 is by way of the apertures 38 in the upper end of the tube 28. It is only after such time that the foam rises in the chamber 34 above the lowermost of the apertures 38 that foam from this chamber may move to the chamber 33. In the example illustrated this will not materially occur until the chamber 34 is essentially filled with foam and a head of pressure is built up on the foam by reason of its containment and the limited escape passage as defined by the apertures 38. As this large head of foam is built up under pressure in the chamber 34, the relatively large initial bubbles produced in the foaming procedure will eventually be forced laterally through the apertures 38 to move radially inward to initially fall to the liquid level at the bottom of the chamber 33. As the bubbles are initially larger than the openings 38, in the process of being forced through the apertures 38 they are squeezed and thereby stripped of some of the liquid content and reduced in size. The stripped liquid is inherently caused to flow down the outer surface of the tube 28 within the chamber 34 in by-passing relation to and to one side of the contained foam. This stripped liquid moves back to the level of the liquid in the chamber 34 to be utilized further in developing additional foam.

As the foam builds up in the chamber 33 with the continuing movement of bubbles thereto from the chamber 34 as described, the bubbles of the foam at this stage will be smaller than in chamber 33 and the liquid encompassing wall thereof will be relatively thinner. The procedure is repeated in the chamber 33, the foam building up to fill this chamber about the shell 27. Of course, the head of pressure is maintained as the compressed air is continued to be delivered to the liquid at the bottom of the chamber 34. With the foam built up in the chamber 33 above the level of the liquid at the bottom, under pressure the bubbles of the foam of the chamber 33 are forced through the apertures 37. In the process, the bubbles are squeezed once more to issue in a reduced size and further stripped of liquid to the chamber 32 to fill this chamber and thereafter be pressured to squeeze through even smaller apertures 36 in the upper portion of the shell 26. Similarly, as foam is continued to be moved radially inward as described, from the chamber 34, the reduced bubbles build up in the chamber 31 and eventually are squeezed through the even smaller apertures 35 in the shell 25. The further stripped and reduced in size bubbles then build up in the central core where they are eventually caused to exit from the container 10 by way of the aperture 29. Of course, once the entire volume of each of the separate chambers interiorly of the container 10 is filled with foam, with the continued in-flow of compressed air under pressure there is a continuing delivery of very dry foam comprised of extremely small bubbles the encompassing liquid wall of each of which is extremely thin.

It will be obvious, that any special chemical can be added to the foam content either initially in the solution used or in the delivery line which directs the final foam substance from the aperture 29 to the place of its deposit.

The exact reason for the effectiveness of the invention embodiments is not clear. However, it has been found that in use thereof, and apparently by reason of the pattern of development of the foam, that one is enabled to produce, utilizing a relatively small container 10 and a limited amount of foaming solution, an unexpectedly large volume of foam. It will of course be obvious that this is the reason that the foam which is developed is extremely dry.

From the foregoing it should also be apparent that the invention units which are very simply constructed will be light and economical to manufacture. The advantages of such construction are believed obvious. The assembly of the unit such as illustrated can be easily effected, the top closure element being applied first to the shell 11, following which the shells 25 through 28 may be simply applied, together with the other interior structure and the bottom closure element 12 then added to provide the completion of the assembly.

The objectives of the invention are accordingly achieved in the simplest of fashion.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A foam producing unit comprising a container, interior wall means defining therein a plurality of side by side chambers, means submerged in a liquid foamable solution for introducing a gas to one of said chambers, under pressure, in a jet-like flow, to enter a small quantity of a liquid foamable solution at the bottom thereof, to cause said solution to form into bubbles which produce a foam rising upwardly through said solution to build up and fill the said one chamber over the level of the liquid therein, means defining laterally directed small bore passages in a portion of said wall means above the level of liquid, said passages communicating said one chamber with an upper part of an adjacent chamber to one side thereof, the said passages being located to limit the movement of foam from said one chamber to said adjacent chamber until the foam is built up, under pressure, in said one chamber, whereupon the bubbles on the foam will be forced to move laterally to said adjacent chamber by way of said small bore passages, the means defining the passages being formed to squeeze and strip liquid from the bubbles passing therethrough and to discharge the resultant bubble structure to enter and build up in said adjacent chamber prior to proceeding to discharge under the head of pressure continued on said foam by the continuing delivery of gas under pressure to said one chamber, said wall means providing a drain surface for return of stripped liquid to the contained quantity of liquid solution.

2. A foam producing unit as in claim 1 characterized in that said adjacent chamber is similarly communicated with an upper portion of a following adjacent side by side chamber, said wall means separating said adjacent from said following adjacent side by side chamber embodying therein small bore passages and being formed to limit movement of foam from said adjacent chamber to the following chamber, which is remote from said one chamber, until said adjacent chamber is substantially filled with foam, said small bore passages communicating said adjacent and following of said chambers functioning when foam is built up under pressure in said adjacent chamber to serve to direct therethrough, under the pressure head established thereby, the reduced bubbles of the foam in said adjacent chamber, in the process of which to squeeze and strip further liquid from the body thereof, providing initially for the free fall and reforming of the bubbles so delivered to the bottom of said following chamber to build up therein preliminary to discharge under the influence of the head of pressure built up in the respective chambers by the developed foam content and the maintenance of a delivery of a gas under pressure to said one chamber.

3. A foam producing unit as in claim 2 characterized by said wall means defining said chambers including a plurality of concentric tubes forming a central or core chamber and outwardly thereof a plurality of chambers concentric to said core chamber.

4. A foam producing unit as in claim 3 characterized in that said tubes extend between the top and bottom closure portions of said container and said small bore passages are provided by perforations in the upper parts of said tubes and said perforations are smaller, progressively, from one tube to another having regard to the direction of movement of foam from said one chamber to said adjacent and following of said chambers.

5. A foam producing unit as in claim 1 characterized in that said container has in connection therewith means for maintaining a predetermined limited amount of foamable solution in the bottom thereof, at least in said one chamber, and said container has in connection therewith a gas delivery line extending into said one chamber to position a gas outlet below the level of the foamable solution provided therein.

6. A foam producing unit as in claim 1 characterized in that said container is comprised of a peripheral shell having an imperforate bottom closure and a cap-like closure means at the top and said wall means defining said chambers including concentrically positioned tubes seated at their bottom to said bottom closure element and engaged at their tops in sealing connection with said top closure means and said small bore passages are defined by radial apertures in said tubes limited to upper portions thereof to provide that foam cannot pass from one to the other of said side by side chambers until the foam builds up under pressure in the said one of said side by side chambers.

7. A foam producing unit as in claim 6 characterized by a delivery tube for directing a foamable solution to the interior of said container from one side thereof adjacent its bottom and a delivery line for gas under pressure provided in connection with said container and arranged to have the delivery end thereof ported for jet delivery of air at a location in said container which is substantially diametrically opposite the location of the entrance of said tube for delivery of said solution.

8. A foam producing unit according to claim 7 characterized by said delivery tube incorporating in connection therewith a valve and float mechanism in the innermost of said chambers, which valve and float mechanism is operative to automatically control the admission of foamable solution into said container, and the bottoms of said tubes being provided with cutouts in the lower ends thereof enabling the spread of delivered solution from the inner of said chambers throughout the bottom areas of each of said chambers.

9. A foam producing unit according to claim 1 characterized by said container being comprised of an outer shell having a bottom closure element and a top closure element, said top closure element being in the form of a cup-like cap which is relatively inverted and has means defining a lip at the mouth thereof in sealed connection with the upper end of said shell and said wall means dividing the interior of said container into said plurality of side by side chambers, said wall means including a plurality of concentric tubes the lower end of which seat to said bottom closure element and the upper ends of which nest in pockets provided by a stepped configuration of the peripheral wall of the cup-shaped top closure element of said container.

10. A foam producing unit as in claim 1, wherein said interior wall means provides a plurality of concentric radially spaced apart tubes defining said chambers, lower ends of said tubes extending into the contained quantity of liquid solution and upper parts of said tubes above the level of said liquid solution being perforated to place said chambers in lateral communication with one another above the level of liquid solution, said container closing upper ends of said chambers and providing a foam outlet communicating with a chamber downstream of said one chamber having regard to the direction of foam movement between chambers, said tubes providing surface area along which stripped liquid may descend to rejoin the contained quantity of liquid solution.

* * * * *

UNITED STATES PATENT AND TRADEMARK OFFICE
CERTIFICATE OF CORRECTION

PATENT NO. : 4,070,302

DATED : January 24, 1978

INVENTOR(S) : James L. Chatterton

It is certified that error appears in the above-identified patent and that said Letters Patent are hereby corrected as shown below:

Col. 2, line 52, delete the period and substitute a comma.

Col. 3, line 4, "cupshaped" is corrected to read -- cup-shaped --.

Col. 5, line 26, "by" is corrected to read -- be --.

Col. 6, line 51, "excape" is corrected to read -- escape --.

Col. 10, line 22, "end" is corrected to read -- ends --.

Signed and Sealed this

Sixteenth Day of May 1978

[SEAL]

Attest:

RUTH C. MASON
Attesting Officer

LUTRELLE F. PARKER
Acting Commissioner of Patents and Trademarks